United States Patent [19]

Dake

[11] 4,142,641
[45] Mar. 6, 1979

[54] TRANSFER MECHANISM

[76] Inventor: Nolan Dake, 378 Connaught Way, Houston, Tex. 77015

[21] Appl. No.: 740,135

[22] Filed: Nov. 8, 1976

[51] Int. Cl.² .............................................. B60P 1/54
[52] U.S. Cl. .................................... 414/541; 414/921
[58] Field of Search ................ 212/56, 57, 145, 64, 212/34, 33; 214/75 R, 75 H; 296/65 R; 5/86, 81, 83

[56] References Cited

U.S. PATENT DOCUMENTS

| 935,170 | 9/1909 | Smith | 5/86 |
|---|---|---|---|
| 2,516,364 | 7/1950 | Caddell | 214/75 H |
| 2,710,659 | 6/1955 | Moederle | 296/65 R |
| 3,123,224 | 3/1964 | Kral | 5/81 R |
| 3,211,306 | 10/1965 | Nissen et al. | 214/75 H |
| 3,313,512 | 4/1967 | Colautti et al. | 296/65 R |
| 3,829,916 | 8/1974 | James | 5/86 |
| 3,848,751 | 11/1974 | Holland, Sr. | 212/56 |
| 3,877,421 | 4/1975 | Brown | 5/81 B |
| 3,957,164 | 5/1976 | Brown | 214/75 H |
| 3,981,484 | 9/1976 | James | 214/75 R |

Primary Examiner—Lawrence J. Oresky
Attorney, Agent, or Firm—Bernard A. Reiter

[57] ABSTRACT

A lifting and transfer mechanism disposed inside a vehicle such as a van for lifting and moving a paralyzed or otherwise immobilized occupant from a wheelchair disposed within the vehicle to a seat of the vehicle itself comprising a horizontally disposed transfer bar pivotally supported at one end and extending along the width of the vehicle and supporting thereon a transfer means which is movably attached to the transfer bar and adapted to support the wheelchair occupant so as to move him from the chair to the vehicle seat.

6 Claims, 6 Drawing Figures

TRANSFER MECHANISM

BACKGROUND OF THE INVENTION

This invention relates to a lifting mechanism for wheel chairs. More particularly the invention is directed to a lifting mechanism for moving wheel chairs and their occupants into a stable position within a motor vehicle.

The concept of utilizing mechanisms for lifting a wheel chair and its occupant into motor vehicle is believed to be well known. Such devices are commonly deficient in numerous respects. Foremost, such lifting devices do not generally securely engage the wheel chair carrying the occupant during the lifting and movement thereof from the ground to the vehicle interior. Slight movements by the occupant do not uncommonly produce a shifting of the wheel chair on the carrying frame, thus commonly producing a precarious tilting of the chair and general instability during the lifting function. Present devices further are not capable of smoothly and sequentially moving the chair, once lifted, from the exterior of the interior of the vehicle. Still further, such presently known devices are incapable of depositing the chair and occupant in a stable position within the vehicle while orienting the chair in the vehicle in a forward direction, all of this without any physical assistance by the chair occupant himself. These seemingly simple achievements must be readily accomplished without physical assistance of the chair occupant for in many instances the chair occupant may be partially or totally paralyzed and therefor incapable of rendering any aid whatever in effectuating the lifting function of the chair, or effectuating orientation of the chair, once lifted, within the vehicle, or in depositing the chair into a fixed position within the vehicle so that the chair itself cannot constitute a hazard to occupants of the vehicle as a consequence of acceleration or deceleration of the vehicle itself.

DESCRIPTION OF THE INVENTION

The present invention is directed to a lift mechanism for wheel chairs and their occupants and which lift mechanism constitutes an integral structure of a motor vehicle such as a van or the like. The lift mechanism disclosed hereinafter obviates numerous of the problems inherent in presently known lift mechanisms, eliminates certain of the risks inherent in such presently known mechanisms and also provides certain functions and advantages not at all present in presently known lift mechanisms. For example, the present invention substantially eliminates any instability and consequent accidents during lifting of the chair and its occupant from the ground into the vehicle, this because of a unique and unobvious supporting structure between the chair and the lift mechanism itself.

Another advantage of the present invention resides in a plurality of motor-driven articulating arms extending from the vehicle and which co-act with one another in sequential, auto-mechanical manner to not only lift the chair and occupant but to move the chair into the vehicle and deposit same in prescribed position and direction.

A still further feature and advantage of the invention resides in the design of a lifting mechanism for wheel chairs which is integrally affixed within a motor vehicle and which is operated independently within the vehicle.

Yet another feature and advantage in the invention resides in the design of a transfer mechanism which enables a wheel chair occupant to be lifted therefrom after the chair is in the vehicle and transferred into a vehicle seat, all without the assistance of a second person.

Yet still another feature and advantage of the invention resides in the design of a transfer mechanism which provides for the lifting and transferring of a wheel chair occupant from the wheel chair into a vehicle seat and the positioning of the wheel chair occupant in said seat in a stable and reliable manner as to enable his subsequent ride in the vehicle.

These and numerous other features and advantages of the invention will become apparent upon the reading of the following detailed description in the specification, claims and drawings, wherein like numerals denote like parts in the various views and wherein:

DETAILED DESCRIPTION OF THE INVENTION

Figure 1:
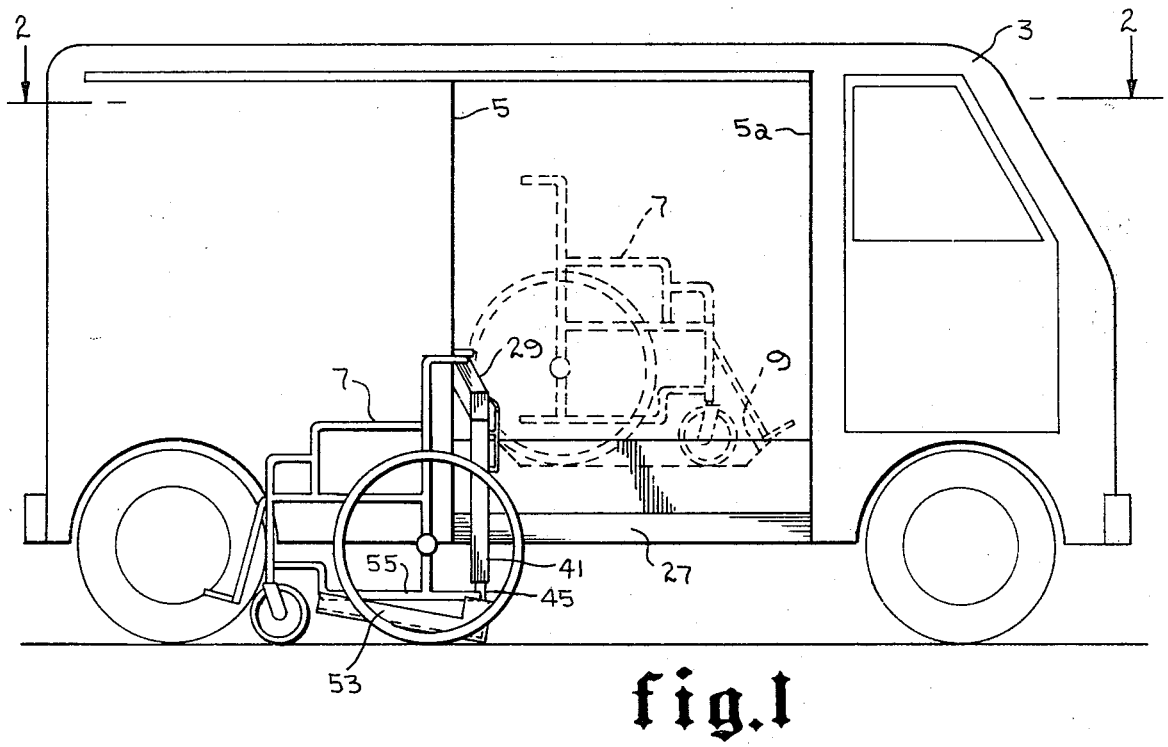
FIG. 1 is an exterior view of a conventional van vehicle showing the wheel chair position on the ground prior to lifting and in a position in the vehicle (in ghost) after lifting thereof.

In FIG. 1 there is shown a van-type vehicle 3 having a side door opening 5 of sufficient width to enable entering and exit of a conventional wheel chair 7 therethrough. The wheel chair is intended to set within the vehicle 3 so that the wheel chair occupant (not shown) faces the same direction as other passengers within the vehicle. The floor of vehicle 3 is characterized by a well 9 which is of appropriate length and width as to receive the wheel chair therein. The walls of the well 9 are of sufficient depth to preclude movement of a wheel chair during the operation of the vehicle. The well should be located partially centrally of the vehicle width (see FIG. 2).

Figure 4:
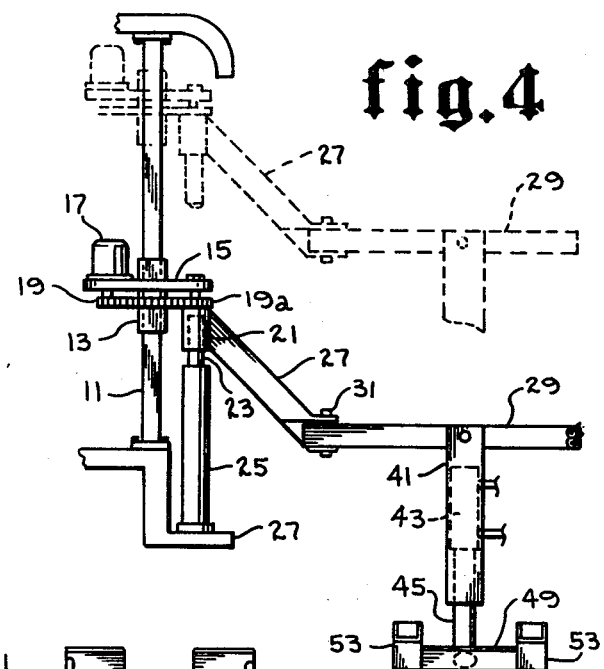
FIG. 4 is a side view of the lifting mechanism showing it in a first and second (ghost) position.

There is disposed adjacent the door opening 5 and rearwardly of the well 9 a strut 11, see FIG. 4. The strut 11 is structurally affixed to the interior floor of the vehicle and extends upwardly to the roof thereof where it is likewise structurally affixed. The strut 11 serves as a principle supporting member for the lift mechanism and is adapted to carry a sliding collar 13 thereon. Affixed to the sliding collar is a support plate 15 which carries an electric motor 17 which is driven itself from a power source contained in the vehicle. The motor 17 is operatively connected to a gear train 19 or the like which is adapted to produce rotational movement of the gear 19a to which is affixed a cap member 21. The cap member 21 is supported by, but arranged to rotate about the ram 23 which is contained within ram cylinder 25 supported on the van step 27. For purposes of stability and structural integrity, a structural bolt or the like, may be affixed to the top of gear 19a and extend through a bore in plate 15, thus permitting rotation of gear 19a while imparting vertical stability to the ram cylinder.

Extending angularly downwardly from the cap 21, and integrally connected thereto, is the rotating member 27 which is adapted to receive the wheel chair supporting structure on the lower end thereof.

Figure 2:
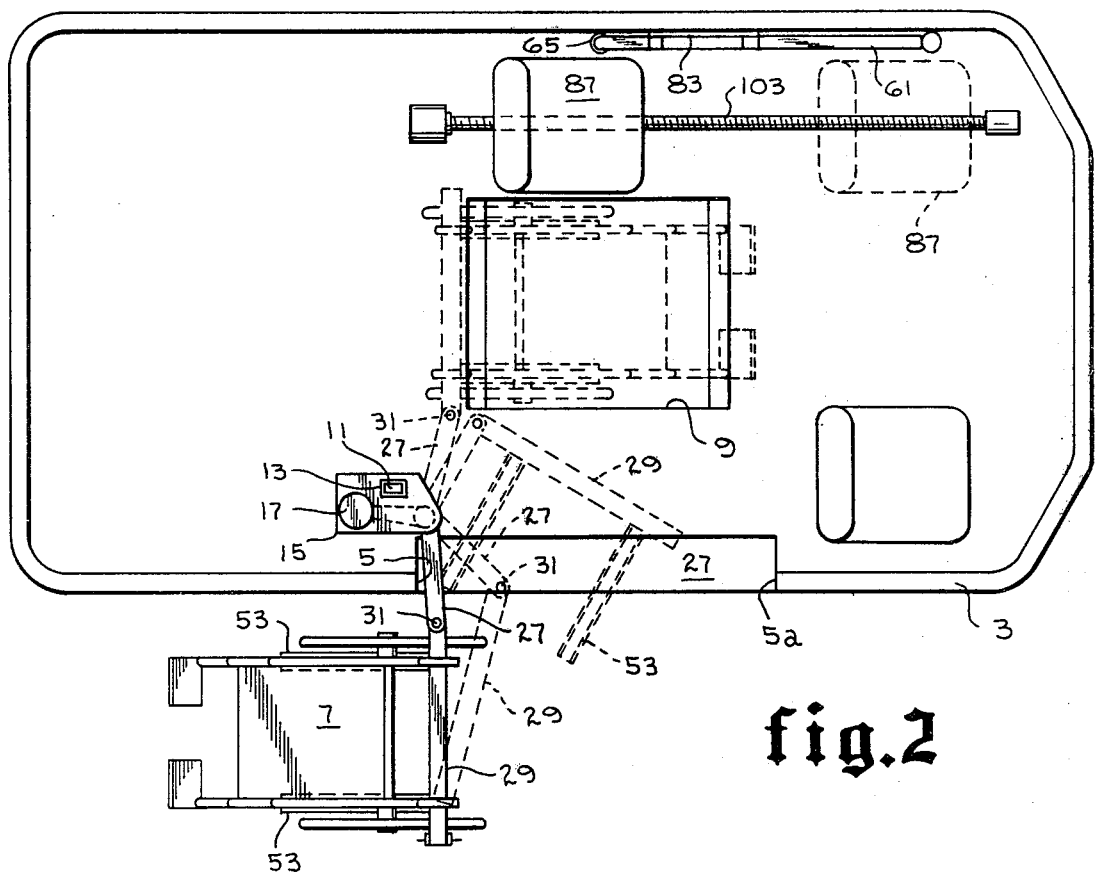
FIG. 2 is a top view of the van in cut-away along the Plane 2—2 of FIG. 1.

The wheel chair supporting structure generally consists of an articulating arm 29 disposed in a substantially horizontal plane and which is affixed to the lower end of rotating member 27 by a securing pin 31 which thus allows pivotal movement of the arm 29 with respect thereto, see FIG. 2.

Affixed to the articulating arm 29 is the support housing 41 which is adapted to contain hydraulic cylinder means 43 having appropriate fluid entry and exit ports communicating therewith as needed (not numbered). The hydraulic cylinder means 43 serves to lift wheel chair supporting frame, and hence the wheel chair and occupant, in the manner hereinafter described.

Figure 3:
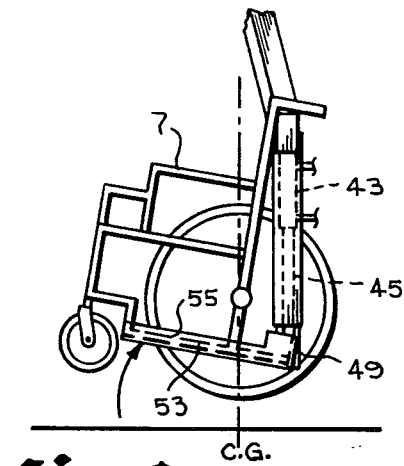
FIG. 3 is a side view of chair and supporting structure showing the relative orientation of the chair with respect thereto.

Extending from the cylinder means 43 and within housing 41 is a hydraulically driven piston 45 (see also FIG. 3) which is connected at its remote end to the wheel chair support frame member 49. The frame member 49 is likewise integrally connected, such as by welding, to a pair of wheel chair support rails 53 (see FIGS. 1, 3 & 4) at its opposite ends (see FIG. 4). The rails 53 are essentially U-shaped tracks in cross section and are of sufficient width to receive therein the lower horizontal frame members 55 of the wheel chair itself, (see FIG. 3). The wheel chair frame members 55 constitute an integral part of the wheel chair structure and generally support and constitute an integral part of the wheel chair framework. These frame members 55 generally reside in a substantially horizontal position with respect to the ground upon which the wheel chair is supported. It may be noted, however, that the wheel chair support rails 53 (see FIG. 1) are not disposed in substantially horizontal relationship to the ground as is the wheel chair frame members 55. It may thus be visualized that once the wheel chair is operatively disposed with the wheel chair frame members 55 above the wheel chair support rails 53, that upon operative retraction of piston 45 into cylinder means 43 (see FIG. 4) the wheel chair support rails (see FIG. 1) not only engage and support the frame members 55 of the wheel chair but also and immediately upon the lifting thereof, tilts the wheel chair backwardly at an angle equivalent to the angle of the support rails 53 with respect to the ground—thus substantially precluding accidental forward falling movement of the wheel chair occupant from the chair itself.

As best shown in FIG. 4, the initial operative position of the lift mechanism maintains the wheel support rails 53 in adjacent relationship to the ground upon which the wheel chair rests. At such time the ram 23 is withdrawn into ram cylinder 25 such that the entire assembly resides in its first (solid line) position. Upon actuation of an appropriate switch, the ram cylinder is hydraulically filled so as to raise ram 23 upwardly and hence correspondingly raise the plate 15 and collar 13 and the associated components described herein above. In so doing the cap 21 on top of the ram causes member 27 to likewise move vertically thus causing upward vertical movement of the entire wheel chair support assembly. As this occurs, and as best shown in FIG. 2, the articulating arm 29 begins to move from its linear relation with rotating member 27 to an angular relation, which angular relationship eventually approaches a right angle. The rotation member 27 therefore moves in a more substantial arc than does articulating arm 29, thus enabling the cantilevered end of articulating arm 29 to be withdrawn in inwardly so as to clear the opening 5a defined by the side doorway of the vehicle. The rotating member continues its pivotal movement until it reaches a substantially inwardly directed position, as best shown by the dotted lines in FIG. 2, at which time the wheel chair has been moved entirely inwardly of the vehicle and is positioned in forward facing direction immediately above the well 9. It will be recognized that the rate of movement of the rotating member 27 is determined by the motor and associated drive trains described in exemplary fashion in FIG. 4. When positioned above the well, the hydraulic control to ram cylinder 25 may be actuated to lower the mechanism, thus lowering the wheel chair to the floor of the well. All of this is accomplished by the wheel chair occupant who has continuing access to actuating toggle switches. It will be recognized, however, thus far only two toggle switches have been used by the occupant or other person, these toggle switches being the one to initiate upward vertical movement of the wheel chair support mechanism and a subsequent toggle switch to initiate release of that mechanism to enable lowering of the wheel chair support mechanism into the well. Both of these toggle switches are readily placable at any appropriate position in or on the surface of the van so that even a person who is substantially totally paralyzed can, with the slightest touch, independently dispose himself and his chair within the van without second party assistance. The wheel chair itself is commonly of the powered variety and in such instance it will be recognized that the occupant can maneuver himself to the van lift mechanism and independently accomplish access to and positioning in the vehicle.

Figure 5:
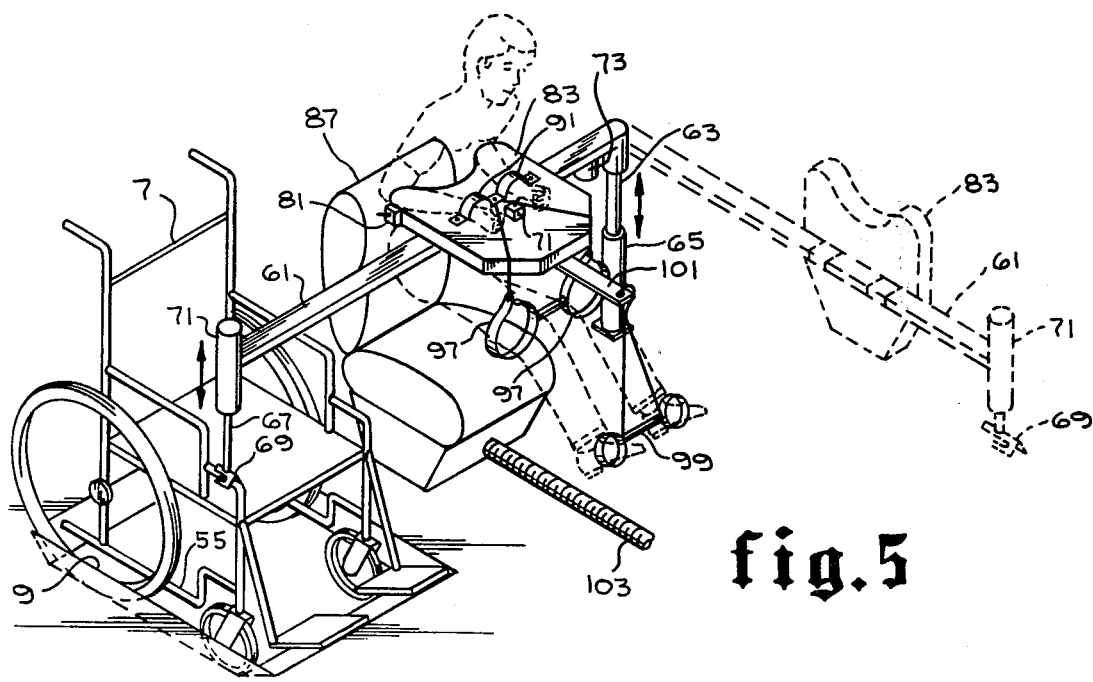
FIG. 5 is an isometric view of the chair deposited within the vehicle and the transfer mechanism for lifting and transporting the chair occupant therefrom to a vehicle seat.

Once the occupant of the wheel chair, and the chair itself, are securely disposed and positioned within the van, such as may be visualized in FIG. 1, it becomes apparent, that in some instances the occupant may wish to travel on a seating means other than the wheel chair. However, since such occupant is either wholly or partially incapacitated, and since it is particularly difficult for other persons to render assistance in moving the occupant within such limited and cramped quarters as the vehicle interior, there is provided a transfer mechanism whereby the wheel chair occupant may, without second party assistance, move himself from the wheel chair to a seat in the vehicle. This is accomplished although the occupant may be substantially incapacitated. As best shown in FIG. 5, the transfer systems comprises a transfer bar 61 which is supported at its one end, in pivotal manner thereabout, on a hydraulically mounted piston 63 extending from a cylinder 65 which is mounted to the vehicle. The transfer bar and its accompanying structure, may be pivoted to an out-of-the-way position adjacent to the interior side of the vehicle, see ghost position FIG. 5. The remote end of the bar may include a supporting arm 67 which is characterized by a saddle means 69 on the end thereof for engaging a supporting structure such as the wheel chair frame. The transfer bar 61 is thus intended to contitute a weight-bearing means, stably supported at its respective ends, and which is adapted to support the weight of the wheel chair occupant while he is being lifted and transferred and lowered within the vehicle. As such, the transfer bar 61 must provide for vertical movement of the wheel chair occupant in order to lift him and lower him from the wheel chair and to the vehicle seat. For this purpose, the hydraulic cylinder 65 and piston 63 act in cooperative relationship with the hydraulic cylinder 71 and its respective piston (not shown) to which is attached the aforementioned support arm 67. Appropriate hydraulic circuitry thus communicates with these cylinders and with an electrical actuation system therefor, generally represented by the toggle switch 71.

The transfer bar 61 may contain a motor 73 and rotating gear 75, each at respective ends of the bar. An endless linkage or other transfer board driving means 77 is operatively connected to the motor and to the gear 75, so that upon right or left actuation of a toggle switch 81, the transfer board 83 is called to move corrlative direction, (see FIG. 6). The transfer board 83 serves to bear the weight of the wheel chair occupant after the wheel chair has been disposed within the vehicle either in the electro-mechanical manner described hereinbefore or through utilization of physical effort by other persons or through any other means. In any event, the transfer board 83 is intended to receive the upper torso weight of the wheel chair occupant when such occupant is still in the wheel chair. Obviously, and as inferred hereinabove, the transfer board is designed to electromechanically move from one side of the vehicle to the other, that is from the wheel chair to the adjacent vehicle seat 87. Thus, the transfer board may be characterized by a wrist restraint means 91 or similar restraint means which may be used by the occupant in order to leverage his torso weight on the transfer board by disposing his elbows at the edge thereof. This position is reached, in the case of a paralyzed occupant, by utilization of the biceps to raise the torso or by utilization of any other muscular effort that the occupant can manifest. Occupants that are not paralyzed may, with greater facility, leverage their weight onto the transfer board in order that the board may, upon actuation of the switch 71, be caused to thus raise the occupant out of the wheel chair. After the occupant has thus raised himself from the wheel chair and is supported on the transfer board 83, actuation of the switch 81 (see FIG. 3) is accomplished in order to initiate transfer movement of the occupant from the wheel chair toward the seat 87. Upon reaching a position above seat 87, the transfer mechanism automatically terminates movement. At this time, the occupant again actuates switch 71, thus causing lowering of the piston 63 and supporting arm 67 into their respective cylinders, and correspondingly thus depositing the occupant on the seat 87 at which time the may release himself from the securing means 91. The transfer bar may then be released from its supported end (saddle means 69) and swung forwardly out of position against the side of the vehicle. The transfer board may be so coupled to the transfer bar 61 as to enable hinged movement by gravity from its horizontal to the vertical position shown (in ghost) in FIG. 5.

Figure 6:
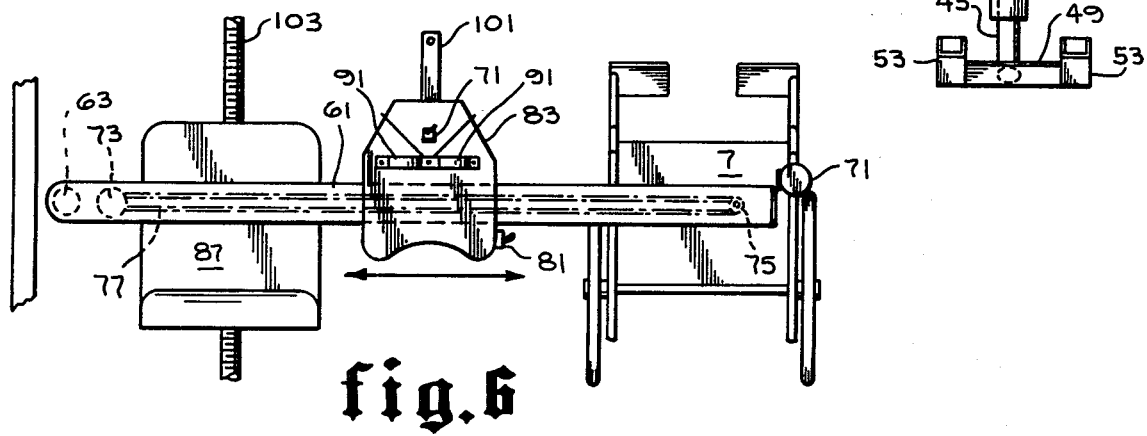
FIG. 6 is a top view of the transfer machine.

It may be noted in FIG. 6 that certain anscilary components may exist with respect to the transfer mechanism. These anscilary components to the system may be present when the occupant is wholly or partially paralyzed and thus requires additional orthopedic restraints for his limbs. These may therefore take the form of a knee spreader 97 and foot spreader 99. Each, the knee spreader 97 and foot spreader 99, are characterized by a rigid member therebetween which is adapted to maintain the legs in a fixed relationship to one another as the lifting and transferring takes place. The foot spreader is characterized additionally by a cord suspended from a fixed extension 101 connected to the transfer board. Similar cords are connected to the respective knee spreaders and may be tied appropriately to the transfer board also. It will thus be recognized that as the occupant is lifted and transferred, his legs will likewise be lifted and transferred appropriately with no undue discomfort in the process.

Upon completion of the transfer to the vehicle seat 87, the seat itself may, if desirable, be moved forwardly or rearwardly for whatever functional or comfortable reason the circumstances may dictate. Therefore and in this regard, there is provided a drive screw 103 which may likewise be electrically operated by the occupant for accomplishing the desired position within the vehicle.

It will be recognized that the foregoing description and drawings represent only exemplary forms of the invention and that the concepts pertaining thereto may be manifest in other structural arrangements than that which is herein described and shown; and that therefore the following claims should be interpreted in accordance with the ordinary meanings of the words contained therein rather than in respect to the specific structures shown and described by way of exemplary fashion herein.

Therefore, that which is claimed and desired to be secured by United States Letters Patent is:

1. In a transfer means for moving an incapacitated person from a first seated position on a first seat to a second seated position on a second seat without second-party assistance and while the person remains in a seated posture comprising:

a transfer bar horizontally disposed in front of said seats and structurally affixed proximate an end thereof to a piston-and-cylinder means for moving the transfer bar up or down, a transfer board means supported on the transfer bar for receiving the weight of a person on his elbows thereon when he is in said first seated position, the transfer board means including arm support means mounted thereon so that the person can shift his weight from the first seated position behind the transfer board to the transfer board itself by resting his arms on the transfer board in engagement with the arm support means and shifting his weight from the first seat to the transfer board means, and then to said second seat, and drive means operatively associated with the transfer bar and transfer board means for moving the latter along the length of the former from adjacent the first seated position of the person to said second seated position of the person while the person is carried thereon, and further including switch means mounted on said transfer board means adjacent said arm support means operable to selectively raise or lower the transfer board means by a relative movement of said piston and cylinder so that the incapacitated person may raise his body after achieving proper positioning on the transfer board means and may lower his body after having moved on the transfer board means along the length of the transfer bar to the said second position.

2. The transfer mechanism of claim 1 wherein the remote end of the transfer bar includes ancillary support means for stablizing the remote end of the transfer bar, said ancillary support means being adapted to engage an adjacent stable structure.

3. The transfer mechanism of claim 2 wherein said ancillary support means includes another piston and cylinder being operatively connected to the means for actuating the first mentioned piston and cylinder so that operation of the actuator jointly and cooperatively raises or lowers the transfer bar in stable and reliable manner.

4. The transfer mechanism of claim 3 wherein the transfer board means is characterized by limb holding means so that the person to be transported may couple their legs to the board means so as to rest the torso thereon in facile manner prior to transfer.

5. The transfer mechanism of claim 4 wherein the transfer bar is radially movable with respect to the vertical axis extending through an end thereof so that the transfer bar and associated structure may be readily swung to a non-obstructive position with respect to the person.

6. The apparatus of claim 5 wherein said transfer board means is hingedly connected to the transfer bar so as to permit rotation of the transfer board from a substantially horizontal operative position to a substantially vertical inoperative position, thereby facilitating storage of the transfer mechanism when the transfer bar is swung to the non-obstructive position.

* * * * *